United States Patent
Hashish et al.

(10) Patent No.: US 6,305,913 B1
(45) Date of Patent: Oct. 23, 2001

(54) PRESSURE PROCESSING A PUMPABLE SUBSTANCE WITH A FLEXIBLE MEMBRANE

(75) Inventors: Mohamed A. Hashish, Bellevue; Chidambaram Raghavan, Kent; Olivier L. Tremoulet, Jr., Edmonds; Bruce M. Schuman, Kent, all of WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 09/374,649

(22) Filed: Aug. 13, 1999

(51) Int. Cl.[7] .......................... F04B 43/10; F04B 17/00; F04B 43/08; F01B 19/00
(52) U.S. Cl. ..................... 417/394; 417/392; 417/478; 92/90; 92/92
(58) Field of Search .................... 417/392, 394, 417/478; 92/90, 92

(56) References Cited

U.S. PATENT DOCUMENTS

| 1,355,476 | 10/1920 | Hering | 442/39 |
|---|---|---|---|
| 1,711,097 | 4/1929 | Kratzer | 422/39 |

(List continued on next page.)

FOREIGN PATENT DOCUMENTS

| 42 42 311 A1 | 8/1993 | (DE) . |
|---|---|---|
| 0 786 595 A2 | 7/1997 | (EP) . |
| 2.087.099 | 12/1971 | (FR) . |
| 2 184 791 A | 7/1987 | (GB) . |
| 62-69969 A | 3/1987 | (JP) . |
| 2-089598 A | 3/1990 | (JP) . |
| 2-089877 | 3/1990 | (JP) . |
| 2-182157 A | 7/1990 | (JP) . |
| 2-245146 A | 9/1990 | (JP) . |
| 3-080066 A | 4/1991 | (JP) . |
| 4-096753 A | 3/1992 | (JP) . |
| 4-108369 A | 4/1992 | (JP) . |
| 4-356177 A | 12/1992 | (JP) . |
| 5-023118 A | 2/1993 | (JP) . |
| 6-125753 A | 5/1994 | (JP) . |
| 8-168515 A | 7/1996 | (JP) . |
| 8-267296 A | 10/1996 | (JP) . |
| WO 99/65341 | 12/1999 | (WO) . |

\* cited by examiner

Primary Examiner—Charles G. Freay
Assistant Examiner—Timothy P. Solak
(74) Attorney, Agent, or Firm—Seed Intellectual Property Law group PLLC

(57) ABSTRACT

An apparatus and method for pressure processing a pumpable substance, such as a pumpable food product or slurry. In one embodiment, the apparatus includes a pressure vessel having an inlet valve toward one end and outlet valve toward the other end. A flexible bladder is coupled between the inlet and outlet valves for receiving the pumpable substance. The pressure vessel can further include a high-pressure inlet port for receiving high-pressure fluid that biases the membrane inwardly to pressure process the pumpable substance. The pumpable substance is then removed from the vessel through the outlet valve.

31 Claims, 7 Drawing Sheets

U.S. PATENT DOCUMENTS

| | | | |
|---|---|---|---|
| 1,728,334 | 9/1929 | Crowther | 422/127 |
| 2,069,820 | 2/1937 | Dodge | 99/219 |
| 2,735,642 * | 2/1956 | Norman | 251/5 |
| 3,094,074 | 6/1963 | Tuckey | 103/44 |
| 3,427,987 * | 2/1969 | Eull | 103/152 |
| 3,451,347 * | 6/1969 | Chimura | 103/152 |
| 3,637,330 * | 1/1972 | Goeldner | 417/389 |
| 4,030,406 | 6/1977 | Wander et al. | 99/461 |
| 4,104,005 * | 8/1978 | Poirier | 417/396 |
| 4,154,558 * | 5/1979 | Green | 417/383 |
| 4,160,408 | 7/1979 | Ulvestad | 99/348 |
| 4,439,113 | 3/1984 | Owen | 417/394 |
| 4,565,297 | 1/1986 | Korner et al. | 220/254 |
| 4,695,472 | 9/1987 | Dunn et al. | 426/237 |
| 4,802,404 | 2/1989 | Dirkin et al. | 92/171 |
| 5,037,276 | 8/1991 | Tremoulet, Jr. | 417/567 |
| 5,037,277 | 8/1991 | Tan | 417/567 |
| 5,048,404 | 9/1991 | Bushnell et al. | 99/451 |
| 5,075,124 | 12/1991 | Horie et al. | 426/577 |
| 5,127,807 | 7/1992 | Eslinger | 417/360 |
| 5,147,184 * | 9/1992 | Newcomer et al. | 417/394 |
| 5,213,029 | 5/1993 | Yutaka | 99/474 |
| 5,228,394 | 7/1993 | Kanda et al. | 99/453 |
| 5,232,726 | 8/1993 | Clark et al. | 426/519 |
| 5,235,905 | 8/1993 | Bushnell et al. | 99/451 |
| 5,288,462 | 2/1994 | Carter et al. | 422/39 |
| 5,316,745 | 5/1994 | Ting et al. | 422/295 |
| 5,328,703 | 7/1994 | Nakagawa et al. | 426/52 |
| 5,370,043 | 12/1994 | Träff et al. | 99/467 |
| 5,439,703 | 8/1995 | Kanda et al. | 426/665 |
| 5,458,901 | 10/1995 | Engler et al. | 426/521 |
| 5,470,547 | 11/1995 | Lhenry | 422/295 |
| 5,579,682 | 12/1996 | Bergman et al. | 99/473 |
| 5,588,357 | 12/1996 | Tomikawa et al. | 99/451 |
| 5,593,714 | 1/1997 | Hirsch | 426/268 |
| 5,622,105 | 4/1997 | Bergman | 100/245 |
| 5,658,610 | 8/1997 | Bergman et al. | 426/665 |
| 5,891,505 | 4/1999 | Schuman et al. | 426/665 |
| 5,996,478 | 4/1999 | Schuman et al. | 99/453 |
| 6,017,572 | 1/2000 | Meyer | 426/521 |
| 6,053,224 | 4/2000 | Hellgren et al. | 144/361 |

PRESSURE PROCESSING A PUMPABLE SUBSTANCE WITH A FLEXIBLE MEMBRANE

TECHNICAL FIELD

This invention relates to methods and devices for pressure processing pumpable substances, such as food or abrasive slurries, using a flexible membrane.

BACKGROUND OF THE INVENTION

Conventional ultrahigh-pressure fluid systems have been used to pressurize pumpable substances, such as foods and slurries. For example, conventional ultrahigh-pressure systems have been used to improve the quality and longevity of food by subjecting the food to pressures in excess of 10,000 psi. Conventional systems have also been used to pressurize abrasive slurries to ultrahigh-pressure levels. The slurries can then be directed toward a substrate in the form of a liquid jet to cut the substrate or treat the surface of the substrate.

One conventional system includes a high-pressure cylinder with a slidable piston that divides the cylinder into two regions. The pumpable substance is placed in one region while a high-pressure fluid is introduced into the other region, driving the piston against the pumpable substance at a very high pressure. One potential drawback with this system is that as the piston may require specially designed seals to prevent the high-pressure fluid from being transported by the piston into the pumpable substance region. The seals may require periodic monitoring and replacement. Accordingly, it may be desirable to use an improved apparatus for pressurizing a pumpable substance while reducing the likelihood for contact between the pumpable substance and the pressurizing liquid.

SUMMARY OF THE INVENTION

The invention relates to methods and apparatus for pressure processing a pumpable substance, such as a food substance. In one embodiment, the apparatus includes a generally rigid high-pressure vessel having a first opening toward one end, a second opening toward the other end, and an internal vessel wall between the first and second ends. A flexible membrane is disposed within the vessel and has a first membrane opening in fluid communication with the first open end of the vessel and a second membrane opening in fluid communication with the second opening of the vessel. At least a portion of the membrane is movable away from the vessel wall to pressurize a portion of the pumpable substance positioned adjacent to the membrane.

In one embodiment, the second membrane opening can be positioned beneath the first membrane opening so that the pumpable substance can exit the membrane through the second opening under the force of gravity. In another embodiment, valves are coupled to the first and second openings of the high-pressure vessel. In one aspect of this embodiment, the valves can each include a passage having a first portion with a first opening and second portion with a second opening. A piston is sealably positioned in the passage and axially movable within the passage between a closed position with the piston blocking fluid communication between the first and second openings and an open position with the first and second openings being in fluid communication with each other. The pumpable substance can be pumped into the membrane through the first opening, pressurized within the membrane by a high-pressure fluid disposed between the membrane and an inner wall of the vessel, and released from the pressure vessel through the second opening.

DETAILED DESCRIPTION OF THE INVENTION

In general, conventional devices for pressure processing pumpable substances have been directed to high-pressure cylinders having an internal piston and/or having an inlet and outlet for the pumpable substance at one end of the cylinder and an inlet and outlet for the high-pressure fluid at the opposite end of the cylinder. By contrast, one aspect of the present invention includes a high-pressure cylinder having a flexible bladder with an entrance opening for the pumpable substance at one end of the bladder and an exit opening for the pumpable substance at the opposite end of the bladder. Accordingly, in one embodiment, the pumpable substance can be introduced through an inlet port at one end of the cylinder and removed from an outlet port at the opposite end of the cylinder, reducing the likelihood for contamination of the outlet port with unpressurized pumpable substance. The apparatus can also take advantage of gravitational forces to more completely remove the pumpable substance from the pressure vessel. Furthermore, by separating the inlet and outlet ports, each port can be larger, increasing the rate at which the pumpable substance can be moved into and out of the bladder, and increasing the size of pumpable substance constituents that can pass into and out of the bladder.

Figure 1:
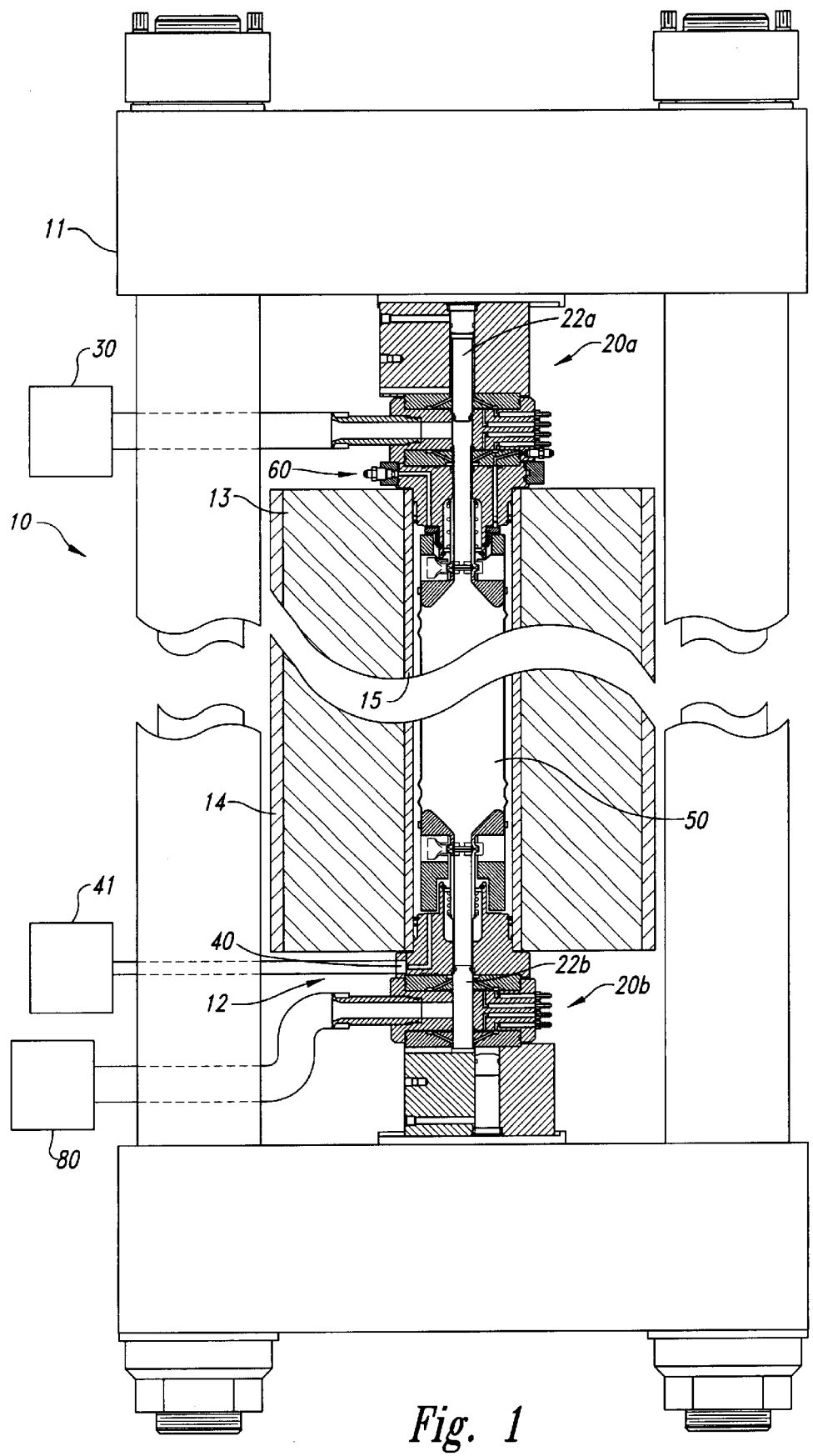
FIG. 1 is a partially schematic, partial cross-sectional side elevation view of an apparatus having an inlet valve, an outlet valve and a bladder in accordance with an embodiment of the invention.

An apparatus 10 for pressure processing a pumpable substance in accordance with an embodiment of the invention is shown in FIG. 1. The apparatus 10 includes a pressure vessel 12 that receives the pumpable substance from a pumpable substance source 30 and pressurizes the pumpable substance with fluid supplied by a high-pressure fluid source 41. The pressure vessel 12 can include an open-ended cylinder 13 surrounded by a protective cylindrical shield 14. Two valve assemblies 20, shown as an inlet valve assembly 20a and an outlet valve assembly 20b, cap opposite ends of the cylinder 13, and are clamped against the cylinder 13 with a yoke 11. A flexible bladder 50 is coupled between the valve assemblies 20. The pumpable substance is pumped into the bladder 50 through the inlet valve assembly 20a, pressurized by high-pressure fluid entering the cylinder 13 from the high-pressure fluid source 41, and pumped through the outlet valve assembly 20b to a receptacle 80, as will be discussed in greater detail below.

In one embodiment, the pressure vessel 12 can include a model number 012122 assembly available from Flow International Corporation of Kent, Wash. that includes the cylinder 13, the yoke 11 and the shield 14, configured to withstand an internal vessel pressure of at least 100,000 psi. In other embodiments, the pressure vessel 12 can include other cylinders 13 and peripheral components configured to withstand an internal pressure of 100,000 psi or another suitable pressure, depending upon the selected pumpable substance and treatment. Such vessels and components are available from ABB Pressure Systems of Vasteras, Sweden, Autoclave Engineering of Erie, Pa., or Engineered Pressure Systems of Andover, Mass.

The pressure vessel 12 can include a liner 15 adjacent an inner surface of the cylinder 13. The liner can be formed from stainless steel or other suitable materials that can withstand the high internal pressures within the cylinder 13. In one embodiment, the liner 15 can be attached to the cylinder 13 by first heating the cylinder 13 so that it expands, then placing the cylinder 13 around the liner 15, and then cooling the cylinder 13 so that it shrinks tightly around the liner 15. If the liner 15 later becomes worn or damaged it can be removed from the cylinder 13 and replaced with a similar liner. An advantage of this arrangement is that cracks that might result from the high pressure within the pressure vessel 12 will tend to form in the liner 15 rather than in the cylinder 13, and it may be easier and less expensive to replace the liner 15 than the cylinder 13.

Figure 2:
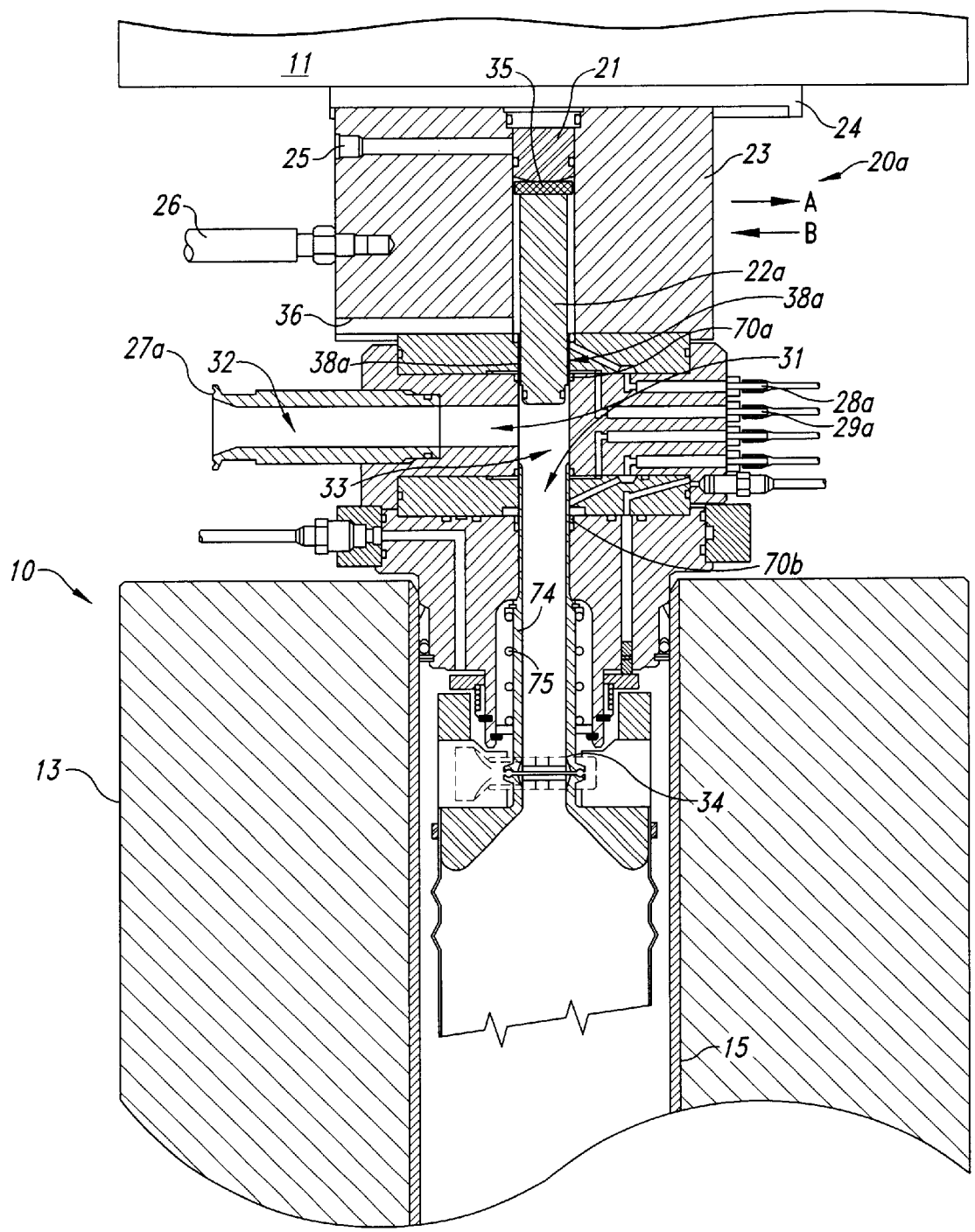
FIG. 2 is a detailed partial cross-sectional side elevation view of an upper portion of the apparatus of FIG. 1 showing the inlet valve in its open position.

FIG. 2 is an enlarged cross-sectional side elevation view of the upper portion of the apparatus 10 shown in FIG. 1. As shown in FIG. 2, the inlet valve assembly 20a fits partially within the cylinder 13 and includes a flow channel 31 having a radial portion 32 in fluid communication with an axial portion 33. Both the radial portion 32 and the axial portion 33 can be strengthened or reinforced, for example, by passing through these portions a die having a slightly oversized diameter, or by using other known strengthening techniques. An inlet port 27a at one end of the radial portion 32 is coupled to the pumpable substance source 30 (FIG. 1). A bladder port 34 at the opposite end of the axial portion 33 is coupled to the bladder 50. An inlet sealing piston 22a moves axially upwardly and downwardly within the axial portion 33 between an open position (shown in FIG. 2) in which the pumpable substance can pass into the bladder 50 and a closed position (discussed in greater detail below with reference to FIG. 3) in which the pumpable substance is sealed within the bladder 50.

When the inlet valve assembly 20a is in its open position, the inlet sealing piston 22a is retracted upwardly into a sealing block 23. An upper piston seal 70a, disposed annularly about the inlet sealing piston 22a, seals the interface between the inlet sealing piston 22a and the axial portion 33 of the flow channel 31 to at least restrict the pumpable substance from passing upwardly along the inlet sealing piston 22a. A lower fluid gap 38a extends annularly about the inlet sealing piston 22a, just above the upper piston seal 70a, for collecting and removing pumpable substance that might escape past the upper piston seal 70a. Purging fluid can be pumped through an upper inlet port 28a and into the lower fluid gap 38a, where it can entrain pumpable substance that might be present in the lower fluid gap 38a. The purging fluid and entrained pumpable substance can then be removed through an upper exit port 29a. In one embodiment, the purging fluid can include water, and in other embodiments the purging fluid can include iodine or other substances that sanitize the surfaces in contact with the purging fluid.

The inlet valve assembly 20a further includes a lower seal 70b beneath the upper seal 70a. When the inlet sealing piston 22a is in its open position (as shown in FIG. 2), the lower seal 70b is covered with a sleeve 74 that is biased upwardly by a sleeve spring 75. The sleeve 74 protects the lower seal 70b from contact with the pumpable substance. The lower seal 70b is exposed and seals against the inlet sealing piston 22a when the inlet sealing piston 22a is moved to its closed position, as will be discussed in greater detail below.

The inlet sealing piston 22a is driven from its open position to its closed position by a driver piston 21 that moves axially within the sealing block 23. Accordingly, the sealing block 23 includes a driver fluid port 25 that supplies pressurized fluid to the driver piston 21 to move the driver piston and the inlet sealing piston 22a together in a downward direction. The sealing block 23 itself can slide laterally along a block rail 24 to secure the inlet sealing piston 22 in the closed position. Accordingly, the sealing block 23 can include an actuator 26 that moves the sealing block 23 laterally back and forth along the block rail 24.

In operation, the inlet sealing piston 22a moves downwardly from its open position to its closed position under the force of the driver piston 21. As the inlet sealing piston 22a moves downwardly, it engages the sleeve 74, forcing the sleeve downwardly against the resistance provided by the sleeve spring 75. At this point, both the upper seal 70a and the lower seal 70b seal against the inlet sealing piston 22a and the inlet sealing piston 22a blocks communication between the radial portion 32 and the axial portion 33 of the flow channel 31. The inlet sealing piston 22a continues to move in a downward direction until an end cap 35 at the upper end of the inlet sealing piston 22a is aligned with a cap engaging surface 36 of the sealing block 23. The sealing block 23 then slides laterally as indicated by arrow A along the block rail 24 until the end cap 35 engages the cap retaining surface 36. The inlet sealing piston 22a is accordingly secured in its closed position.

To open the valve 20a, the sealing block 23 is moved laterally as indicated by arrow B until the driver piston 21 is axially aligned with the inlet sealing piston 22a. The sleeve spring 75 then moves the sleeve 74 upwardly, and the sleeve 74 together with pressure from within the bladder 50 drive the inlet sealing piston 22a upwardly to its open position.

Figure 3:
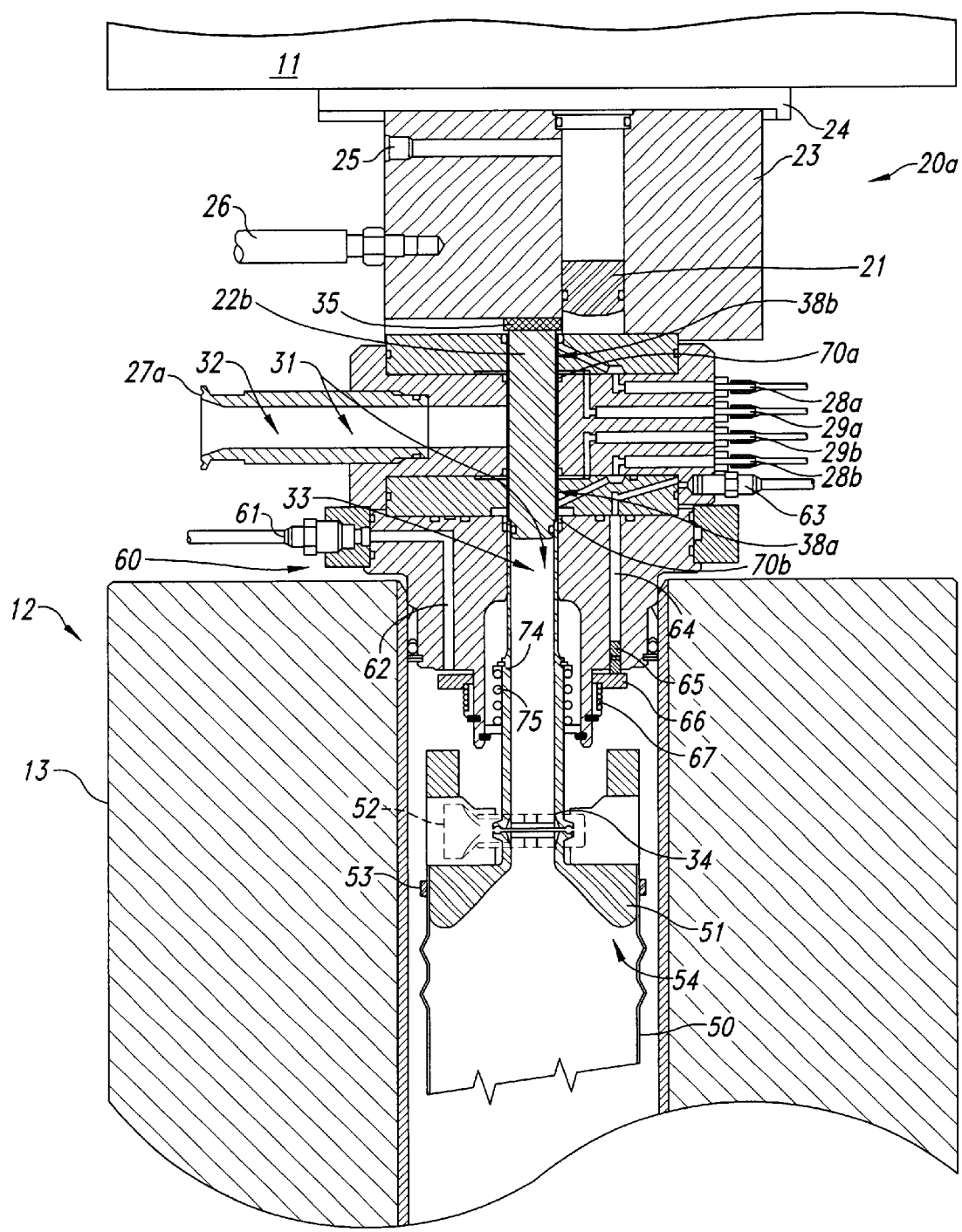
FIG. 3 is a detailed partial cross-sectional side elevation view of the upper portion of the apparatus of FIG. 1 showing the inlet valve in its closed position.

FIG. 3 is a cross-sectional side elevation view of the inlet valve 20a of FIG. 2 shown in the closed position. The inlet sealing piston 22a has moved downwardly in the axial portion 33 of the flow channel 31 and the sealing block 23 has moved laterally so that the cap engaging surface 36 engages the end cap 35 to prevent the inlet sealing piston 22a from moving in an upward direction. The inlet sealing piston 22a has moved the sleeve 74 downwardly so that the lower piston seal 70b engages the inlet sealing piston 22a. Accordingly, the lower fluid gap 38a, now positioned just above the lower piston seal 70b, is aligned with a lower inlet port 28b and a lower exit port 29b to remove pumpable substance from the lower fluid gap 38a in a manner generally similar to that discussed above with reference to FIG. 2. An upper fluid gap 38b is aligned with the upper inlet port 28a and the upper exit port 29a to operate in a manner similar to that discussed above with reference to FIG. 2. Accordingly, the inlet valve 20a can prevent the pumpable substance from escaping upwardly past the inlet sealing piston 22a when the inlet valve 20a is in its closed position and the bladder 50 is under pressure.

As shown in FIG. 3, the bladder 50 is attached to the sleeve 74 to receive the pumpable substance through the inlet valve 20a. In one embodiment, the bladder 50 includes an elongated tube having an upper opening 54. The bladder 50 can be formed from rubber, neoprene or any flexible, generally nonporous material. In one embodiment, the bladder 50 can include a medical-grade rubber suitable for use with food products. In another embodiment, the bladder 50 can include an abrasion-resistant rubber or other abrasion resistant material for use with abrasive slurries. In still another embodiment, the bladder 50 can include a laminate of multiple plies bonded together with an adhesive, such as a rubber cement. One advantage of this embodiment is that the bladder 50 can separate the pumpable substance from the high-pressure fluid even if one or more of the plies has a pin hole or other puncture. Another advantage is that the multiple plies can thicken the bladder 50 and provide thermal insulation between the pumpable substance and the high-pressure fluid. Accordingly, hot or cold pumpable substances can be pressure processed in the pressure vessel 12 with a reduced transfer of heat to or from the pumpable substance.

A bladder fitting 51 extends through the upper opening 54 of the bladder 50 and is attached to the bladder 50 with a band 53 or alternatively, with a food-grade adhesive that discourages microorganism growth, or another suitable securing device. The bladder fitting 51 is then coupled to the sleeve 74 with a removable coupling 52, such as are available from Tri-Clover, Inc., of Kenosha, Wis. In one embodiment, the bladder fitting 51 can be sized to take up a substantial volume within the cylinder 13, thereby reducing the volume of high-pressure fluid required to pressurize the bladder 50 and reducing the time required to move the high-pressure fluid into and out of the cylinder 13.

Figure 4:
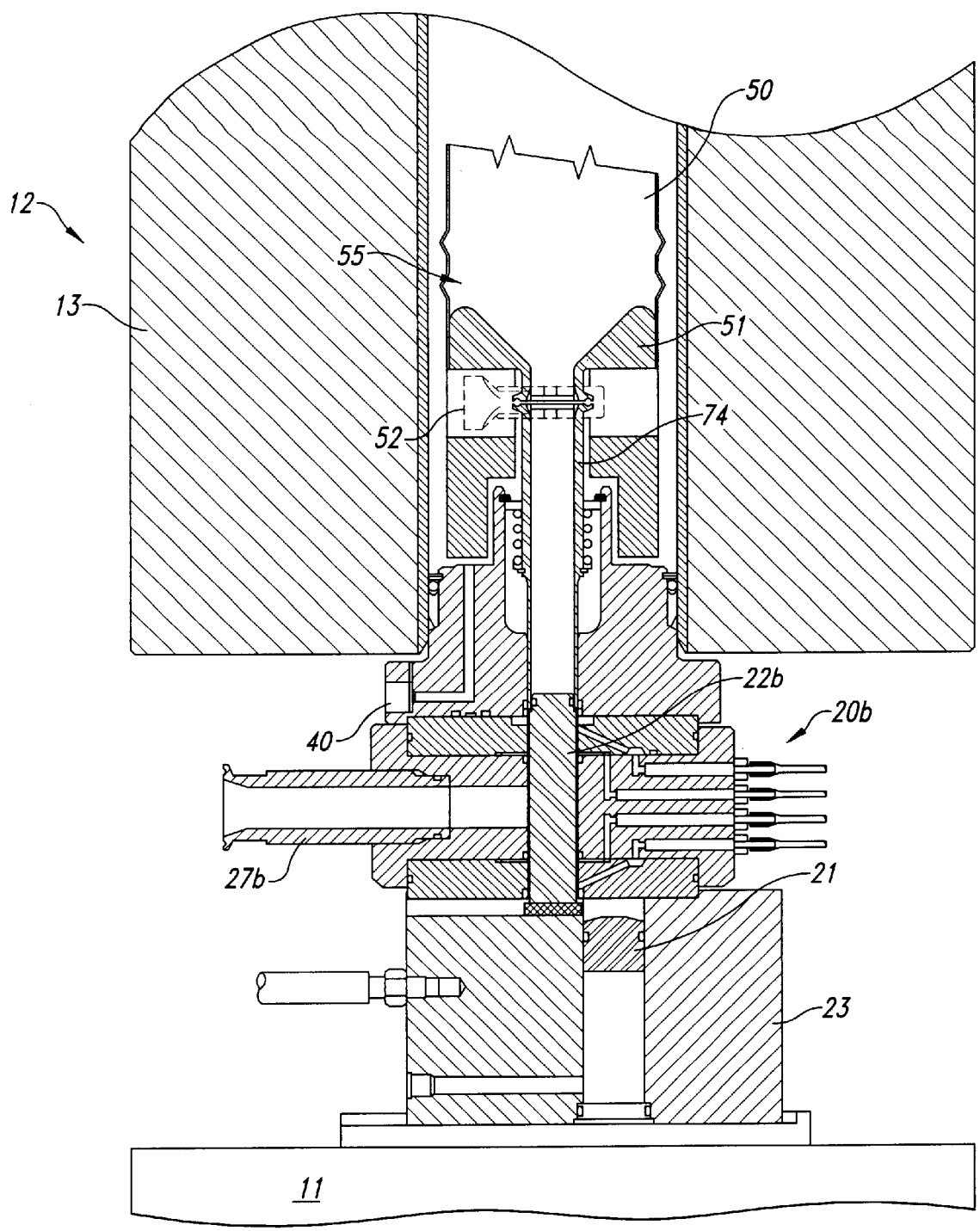
FIG. 4 is a detailed partial cross-sectional side elevation view of the lower portion of the apparatus of FIG. 1 showing the outlet valve in its closed position.

FIG. 4 is a cross-sectional side elevation view of the lower portion of the apparatus 10 shown in FIGS. 1–3. As shown in FIG. 4, the bladder 50 includes a lower opening 55 attached to a bladder fitting 51 which is in turn coupled to a sleeve 74 of the outlet valve assembly 20b. In one embodiment, the bladder 50 can be stiffer near the lower opening 55 than near the upper opening 54 (FIG. 3) to prevent the bladder 50 from collapsing on itself near the lower opening 55 when the pumpable substance is removed. In one aspect of this embodiment, the stiffness of the bladder 50 can decrease in a generally uniform manner in an upward direction extending away from the outlet valve assembly 20b. In another aspect of this embodiment, the bladder 50 can be made stiffer near the lower opening 55 by increasing the number of plies that form the bladder 50 in this region.

The outlet valve assembly 20b includes an outlet sealing piston 22b, a driver piston 21 and a sealing block 23, all of which operate in generally the same manner as was discussed above with reference to the inlet valve assembly 20a shown in FIGS. 2 and 3. Accordingly, the outlet valve assembly 20b is closed (as shown in FIG. 4) while the pumpable substance is pressurized, and is opened to allow the pressurized pumpable substance to pass out of the bladder 50.

The outlet valve assembly 20b includes a high-pressure port 40 coupled to the high-pressure fluid source 41 (FIG. 1). The high-pressure fluid enters the pressure vessel 12 through the high-pressure port 40 at pressures up to and exceeding 100,000 psi, fills the region between cylinder 13 and the bladder 50, and pressurizes the contents of the bladder 50. In one embodiment, the high-pressure fluid can be water.

Alternatively, the high-pressure fluid can be sterile citric acid or another sterile solution. In a further aspect of this embodiment, the high-pressure fluid can be selected to include water at an elevated temperature, for example, about 100° F. At such elevated temperatures, the ductility of the metal forming the cylinder 13 can be increased, as determined using a Charpy test or other ductility tests.

After pressurization, the pressurized pumpable substance can be removed through the outlet valve 20b by moving the outlet valve 20b to its open position and allowing the pumpable substance to pass through a pumpable substance exit port 27b to the receptacle 80 (FIG. 1). In one embodiment, the pumpable substance can exit the bladder 50 solely under the force of gravity. In one aspect of this embodiment, the inlet valve 20a is opened to a sterile environment at atmospheric pressure to allow the pumpable substance to descend from the bladder 50 under the force of gravity without introducing contaminants to the bladder 50. In another embodiment, the pumpable substance can be squeezed from the bladder 50 by filling the pressure vessel 12 with a fluid at a relatively low pressure. In one aspect of this embodiment (best seen in FIG. 3), the pressure vessel 12 can include a low pressure valve 60 for transporting the low pressure fluid to and from the cylinder 13.

The low pressure valve 60 (FIG. 3) can include a fluid passage 62 having a fluid port 61 at one end coupled to a source of the low pressure fluid (not shown). At the opposite end of the fluid passage 62 is a movable sealing ring 66 that can be moved between an open position (shown in FIG. 3) that allows fluid communication between fluid passage 62 and the interior of the cylinder 13, and a closed position that prevents such fluid communication. In one embodiment, the sealing ring 66 is biased upwardly toward its closed position with a sealing ring spring 67. The sealing ring 66 can be moved downwardly against the force of the sealing ring spring 67 to its open position by an actuating piston 65. The actuating piston 65 can be positioned in a gas passage 64 and can move downwardly within the gas passage 64 when gas is supplied through a gas port 63. To close the fluid passage 62, the pressure at the gas port 63 is reduced, allowing the sealing ring spring 67 to move the sealing ring 66 and the actuating piston 65 upwardly until the sealing ring seals against the inlet valve assembly 20a and closes the fluid passage 62.

In one embodiment, the fluid passage 62 is one of three fluid passages 62 coupled to the fluid port 61 and spaced 120° apart from each other around the sleeve 74. Similarly, the gas passage 64 can be one of three gas passages 64 coupled to the gas port 63 and spaced 120° apart from each other around the sleeve 74. In other embodiments, the low pressure valve 60 can include more or fewer fluid passages 62 and gas passages 64. An advantage of having a plurality of gas passages 64 is that they more evenly distribute the force applied to the sealing ring 66, reducing the likelihood that the sealing ring 66 will become cocked or tilted as it moves up and down. An advantage of having a plurality of fluid passages 62 is that the low pressure fluid can be more quickly and uniformly transported into and out of the cylinder 13. In another embodiment, the outlet valve 20b (FIG. 4) can also include a low pressure valve generally similar to the low pressure valve 60 discussed above. An advantage of having two low pressure valves 60 is that the low pressure fluid can be even more quickly transported into and out of the cylinder 13. A further advantage is that the inlet and outlet valves 20a, 20b can be interchangeable.

Operation of an embodiment of the apparatus 10 is best understood with reference to FIG. 1. Initially, the outlet valve assembly 20b is closed by moving the outlet sealing piston 22b to its upper position (shown in FIG. 1) and the inlet valve assembly 20a is opened by moving the inlet sealing piston 22a to its upper position (shown in FIG. 1). The pumpable substance is pumped through the inlet valve assembly 20a and into the bladder 50. The inlet valve assembly 20a is then closed by moving the inlet sealing piston 22a downwardly and high-pressure fluid is pumped through the high-pressure port 40 of the outlet valve assembly 20b. The high-pressure fluid fills the space between the bladder 50 and the liner 15 and biases the bladder 50 inwardly to pressurize the pumpable substance within the bladder 50. The pumpable substance is then pressurized for a selected period of time.

Turning now to FIG. 3, the low pressure valve 60 is opened by forcing gas through the gas passage 64 to move the actuating piston 65 against the sealing ring 66. As the sealing ring 66 moves away from the fluid passage 62, high-pressure fluid escapes through the fluid passage 62 and out through the fluid port 61. The outlet valve 20b (FIG. 1) is then opened and fluid is supplied at low pressure through the low pressure valve 60 to collapse the bladder 50 and force the pressurized pumpable substance out through the outlet valve 20b. Once the bladder 50 has collapsed, the apparatus 10 is ready to pressure process a new batch of pumpable substance. After a selected number of pressure cycles, the bladder 50 can be cleaned, for example, by passing through the bladder (in succession) a rinse solution, a caustic solution, hot water, a chemical sterilizer and citric acid.

An advantage of an embodiment of the apparatus 10 shown in FIGS. 1–4 is that the bladder 50 can eliminate contact between the pumpable substance and the high-pressure fluid. Accordingly, the likelihood that that pumpable substance will be contaminated with high-pressure fluid (and vice versa) is substantially reduced. A further advantage is that the inlet valve 20a is separated by a substantial distance from the outlet valve 20b, reducing the likelihood of contaminating the pressurized pumpable substance with unpressurized pumpable substance. Furthermore, by positioning the outlet valve 20b beneath the inlet valve 20a, the apparatus 10 can take advantage of gravity to remove the pressurized pumpable substance from the vessel 12. Accordingly, a greater portion of the pumpable substance can be removed from the vessel 12 after pressurization.

Yet another feature of the apparatus 10 is that the flow passages 31 through the valves 20 can have relatively large cross-sectional areas. This is advantageous because it allows the pumpable substance to enter and exit the vessel 13 more quickly. It also allows pumpable substances having chunks or large suspended particles to be more easily directed into and out of the vessel 13. For example, when the apparatus 10 is used to pressure process chunks of fruit, such as pineapples, the flow passages 31 can have diameters of about one inch. In other embodiments, the flow passages can have other diameters to accommodate chunks of pumpable substance having other dimensions.

Still another advantage is that the movable sleeve 74 can reduce the likelihood of exposing at least one of the piston seals 70b to the pumpable substance. Accordingly, the pumpable substance is less likely to become trapped in the piston seal 70b. Yet another advantage is that the flow of purging fluid alongside the pistons 22 can further reduce the likelihood of pumpable substance escaping from the vessel 12 when the vessel 12 is under pressure.

In the embodiment discussed above with reference to FIGS. 1–4, the pumpable substance is placed within the bladder 50 and the high-pressure fluid is disposed between the bladder 50 and the inner walls of the cylinder 13. In another embodiment, the pumpable substance can be positioned between the bladder 50 and the inner walls of the cylinder 13 while the high-pressure fluid is disposed within the bladder 50. An advantage of placing the pumpable substance in the bladder 50 is that it may be easier to remove the pumpable substance from within the bladder 50 than from between the bladder 50 and the walls of the cylinder 13.

Figure 5:
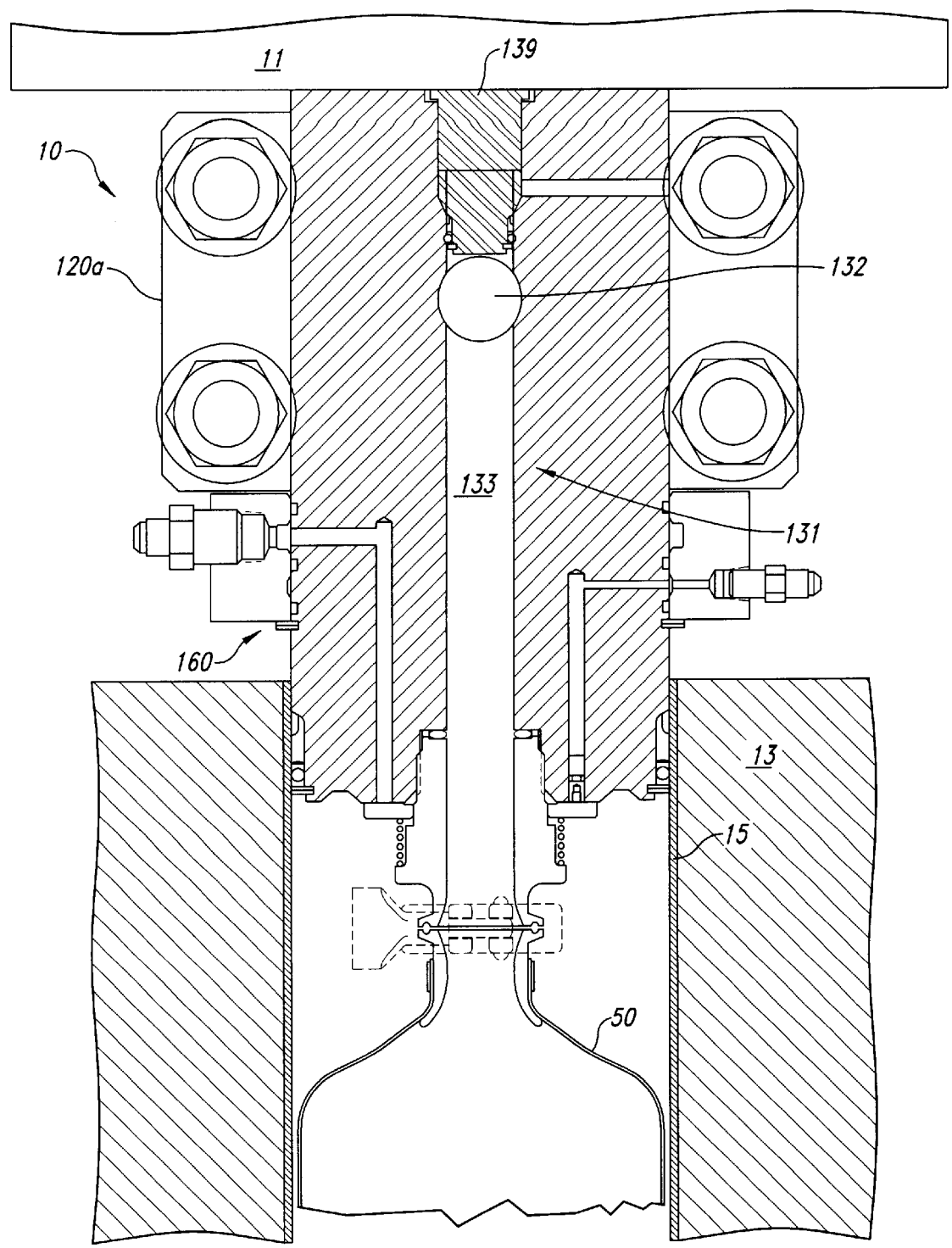
FIG. 5 is a partial cross-sectional side elevation view of the apparatus shown in FIG. 1 having an inlet valve in accordance with another embodiment of the invention.

FIG. 5 is a cross-sectional side elevation view of the upper portion of the apparatus 10 shown in FIG. 1 having an inlet valve 120a in accordance with another embodiment of the invention. The inlet valve 120a includes a low pressure valve 160 generally similar in appearance and operation to the low pressure valve 60 discussed above with reference to FIG. 3. The inlet valve assembly 120a further includes a flow channel 131 having an axial portion 133 connected to a radial portion 132. One end of the axial portion 133 is closed with a plug 139, and the other end is coupled to the bladder 50. As will be discussed in greater detail below, fluid communication between the axial portion 133 and the radial portion 132 can be opened or closed by moving a piston within the radial portion 132.

Figure 6:
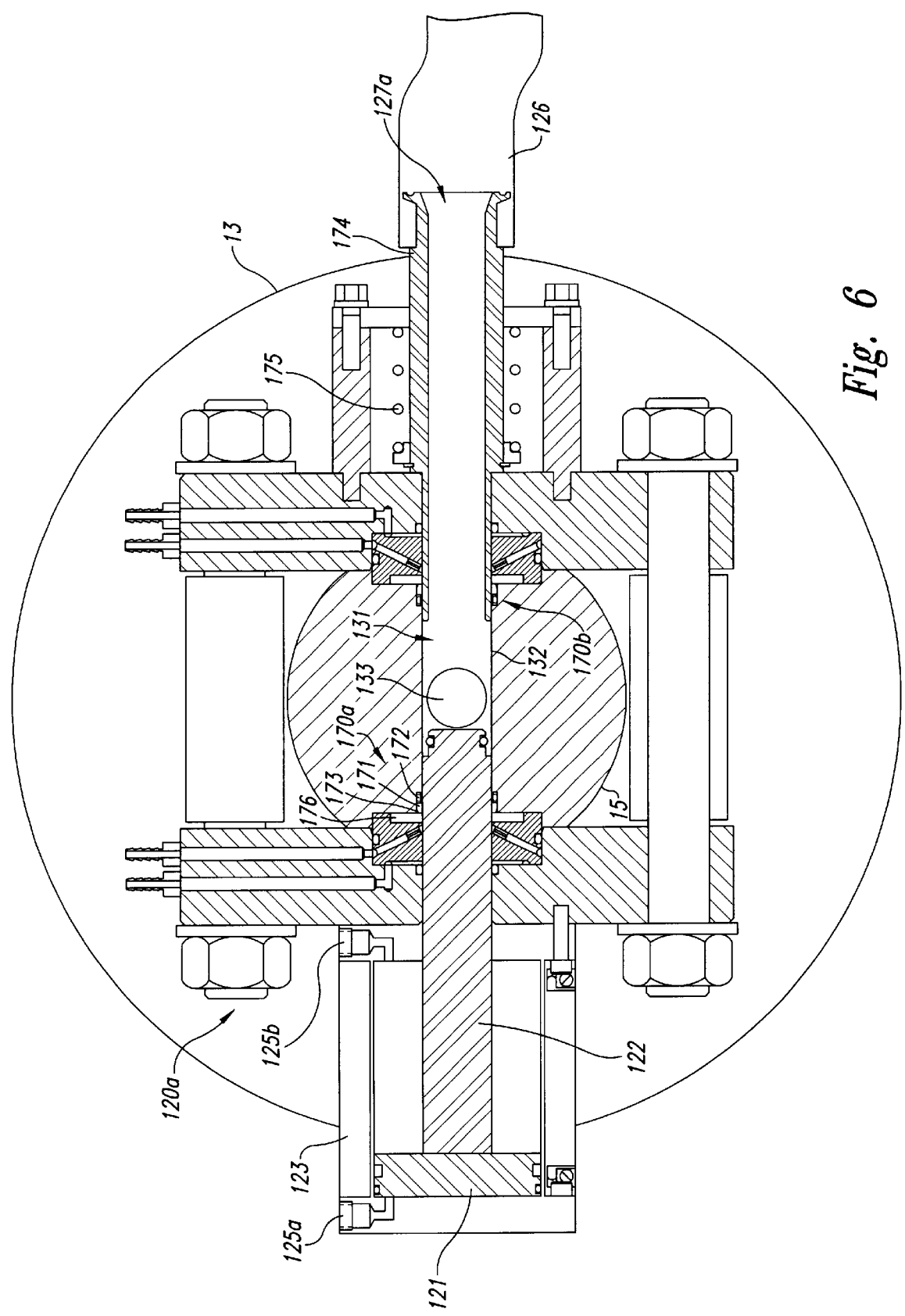
FIG. 6 is a partial cross-sectional top view of the inlet valve of FIG. 5 shown in its open position.

FIG. 6 is a top, partial cross-sectional view of the inlet valve 120a shown in FIG. 5. As shown in FIG. 6, the inlet valve 120a includes a sealing piston 122 that moves laterally within the radial portion 132 of the flow channel 131. When the sealing piston 122 is in its leftmost position (shown in FIG. 6) the pumpable substance can pass from the radial portion 132 of the flow channel 131 to the axial portion 133 and into the bladder 50 (FIG. 5). When the sealing piston 122 is in its rightmost position (discussed in greater detail below with reference to FIG. 7), the sealing piston 122 prevents fluid communication between radial portion 132 and the axial portion 133.

The sealing piston 122 is sealed within the radial portion 132 with two piston seal assemblies 170, shown as a left piston seal assembly 170a and a right piston seal assembly 170b. The right piston seal assembly 170b is covered with a sleeve 174 when the inlet valve is in its open position (as shown in FIG. 6). The sleeve 174 is biased toward the covered position by a sleeve spring 175 when the inlet valve 120a is in the open position, in a manner generally similar to that discussed above with reference to the sleeve 74 shown in FIG. 2. The sleeve 174 includes an inlet port 127a coupled to the pumpable substance source 30 (FIG. 1) with a flexible conduit 126. Accordingly, the conduit 126 can maintain the connection between the pumpable substance source 30 and the inlet port 127a as the sleeve 174 moves laterally.

The seal assemblies 170 can include a seal 171 that extends between the sealing piston 122 and the walls of the radial portion 132 of the flow channel 131. The seal assemblies 170 can also include an O-ring 172, an anti-extrusion ring 173 to prevent the seal 171 from extruding outwardly away from the radial portion 132, and a backup ring 176 to support the seal 171 and the anti-extrusion ring 173. This seal assembly arrangement, shown in detail in FIG. 6, can also be used in conjunction with the seals 70a, 70b shown in FIGS. 1–4.

A driver piston 121 connected to one end of the sealing piston 122 drives the sealing piston 122 laterally within the radial portion 132. The driver piston 121 moves within a driver cylinder 123 which can include two driver fluid ports 125 (shown as a left port 125a and a right port 125b). When pressurized fluid is supplied to the right port 125b, the driver piston 121 and the sealing piston 122 move to the left toward the open position. When pressurized fluid is supplied to the left port 125a, the driver piston 121 and the sealing piston 122 move to the right toward the closed position.

Figure 7:
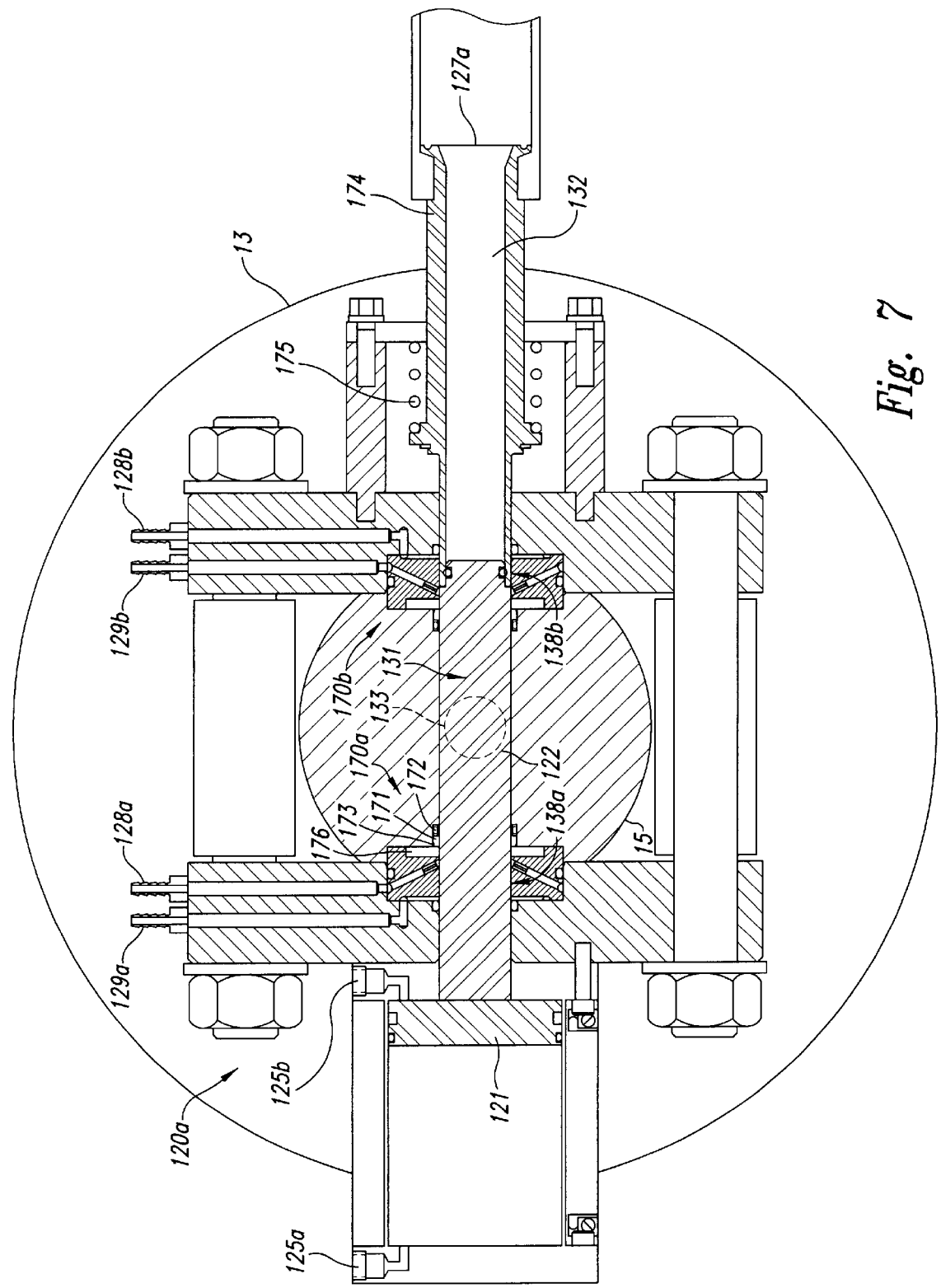
FIG. 7 is a partial cross-sectional top view of the inlet valve of FIG. 5 shown in its closed position.

FIG. 7 is a top, partial cross-sectional view of the inlet valve assembly 120a shown in FIG. 6 with the sealing piston 122 and the driver piston 121 moved to the closed position. As shown in FIG. 7, the sealing piston 122, when in the closed position, prevents fluid communication between the radial portion 132 and the axial portion 133 of the flow channel 131. Accordingly, the sealing piston 122 can prevent pumpable substance from escaping from the cylinder 13 when the cylinder is pressurized.

When the sealing piston 122 is in the closed position, it engages the sleeve 174 and moves the sleeve 174 to the right (as seen in FIG. 7) until the sealing piston 122 seals against the right seal assembly 170b. Fluid gaps 138 (shown as a left fluid gap 138a and a right fluid gap 138b) adjacent the sealing piston 122 receive purging fluid from inlet ports 128 (shown as a left inlet port 128a and a right inlet port 128b) to purge the region adjacent the seals 170. The purging fluid, with pumpable substance entrained, can be removed through exit ports 129a and 129b in a manner generally similar to that discussed above with reference to the fluid gaps 38 shown in FIGS. 2 and 3.

From the foregoing it will be appreciated that, although specific embodiments of the invention have been described herein for purposes of illustration, various modifications may be made without deviating from the spirit and scope of the invention. For example, the liner 15 can be disposed in a high-pressure vessels that include means other than the bladder 50 for pressurizing the pumpable substance. Accordingly, the invention is not limited except as by the appended claims.

What is claimed is:

1. An apparatus for pressure processing a pumpable substance, comprising:

a generally rigid high-pressure vessel having a first opening toward a first end, a second opening toward a second end and an internal vessel wall between the first and second ends;

a flexible membrane disposed within the vessel and coupled to a first valve, the membrane having a first membrane opening in fluid communication with the first opening of the vessel, the membrane further having a second membrane opening in fluid communication with the second opening of the vessel, at least a portion of the membrane being spaced apart from the vessel wall for pressurizing a portion of the pumpable substance adjacent the membrane;

the first valve being in fluid communication with the first membrane opening for regulating a flow of the pumpable substance through the first membrane opening, the first valve including a valve body having a passage therein, the passage including a first portion having a first opening and a second portion having a second opening and a piston sealably positioned in the passage and axially movable within the passage between a closed position with the piston blocking fluid communication between the first opening of the first portion of the passage and the second opening, of the second portion of the passage, and an open position with the first opening of the first portion of the passage in fluid communication with the second opening of the second portion of the passage; and a second valve in fluid communication with the second membrane opening for regulating the flow of the pumpable substance through the second membrane opening, wherein the first and the second valves respectively close the first and the second membrane openings to the flow of the pumpable substance when the portion of the pumpable substance is pressurized.

2. The apparatus of claim 1 wherein the first membrane opening is positioned above the second membrane opening for passing the portion of the pumpable substance in an at least partially downward direction between the first and second membrane openings.

3. The apparatus of claim 1 wherein the first opening of the vessel is coupleable to a source of the pumpable substance and the vessel has a third opening coupleable to a source of high-pressure fluid for biasing the portion of the membrane away from the vessel wall to pressurize the portion of the pumpable substance adjacent to the membrane.

4. The apparatus of claim 1 wherein the pressure vessel is configured to withstand an internal static pressure of at least 100,000 psi.

5. The apparatus of claim 1 wherein vessel includes a generally cylindrical portion with first and second open ends, a first cap at least proximate to the first end and a second cap at least proximate to the second end, the first opening of the vessel extending through the first cap, the second opening of the vessel extending through the second cap, further wherein the membrane is coupled to the first and second caps.

6. The apparatus of claim 1, further comprising a generally rigid liner positioned between the membrane and the vessel wall.

7. The apparatus of claim 6 wherein the liner includes stainless steel.

8. The apparatus of claim 6 wherein the liner is removable from the vessel.

9. The apparatus of claim 1, further comprising an attachment device coupled between the membrane and the vessel for securing the membrane to the vessel.

10. The apparatus of claim 9 wherein the vessel includes a generally cylindrical portion with first and second open ends and a cap portion having a coupling portion extending into the first open end of the cylindrical portion, the coupling portion extending through the first membrane opening such that at least a portion of the membrane is positioned between the coupling portion and the vessel wall, further wherein the attachment device includes an elongated member extending around the membrane proximate to the first membrane opening, the elongated member biasing the membrane toward the coupling portion.

11. The apparatus of claim 9 wherein the attachment device includes an adhesive positioned between the membrane and a portion of the vessel to sealably attach the membrane to the vessel.

12. The apparatus of claim 1 wherein the membrane has a generally tubular shape.

13. The apparatus of claim 1 wherein the membrane has a first stiffness toward the first membrane opening and a second stiffness between the first and second membrane openings, the first stiffness being greater than the second stiffness.

14. The apparatus of claim 1 wherein the membrane includes a material selected from neoprene and rubber.

15. An apparatus for pressure professing a pumpable substance, comprising:

a generally rigid high-pressure vessel having a vessel wall between an interior region of the vessel and an exterior region of the vessel;

a flexible membrane in the interior region of the vessel, the membrane having a first membrane opening in the interior region of the vessel coupled to a source of the pumpable substance to be treated, the membrane further having a second membrane opening spaced apart from the first membrane opening, the membrane having a first surface facing a second surface facing opposite the first surface at least a portion of the first surface facing and spaced apart from the vessel wall to define a fist region, the second surface facing a second region with the membrane between the first and second regions, the membrane being movable toward and away from the vessel wall for pressurizing a portion of the pumpable substance within the vessel;

an outlet valve selectively operable between an open position providing fluid communication via the second membrane opening and a closed position at least substantially restricting fluid communication via the second membrane opening; and an inlet valve selectively operable between an open position providing fluid communication between the source of the pumpable substance to be treated aid the interior region of the vessel via the first membrane opening and a closed position at least substantially restricting fluid communication via the first membrane opening, wherein the inlet valve and the outlet valves are in the respective closed positions when the membrane is spaced relatively away from the vessel wall.

16. The apparatus of claim 15 wherein the membrane is positioned between the portion of the pumpable substance and the vessel wall, further wherein the membrane is flexible between a first position with a portion of the membrane located a first distance from the vessel wall and a second position with the portion of the membrane located a second distance from the vessel wall, the second distance being greater than the first distance to pressurize the portion of the pumpable substance.

17. The apparatus of claim 15 wherein the vessel wall has a first aperture and the first membrane opening is in fluid communication with the first aperture.

18. The apparatus of claim 17 wherein the vessel wall has a second aperture and the second membrane opening is in fluid communication with the second aperture.

19. The apparatus of claim 15 wherein vessel includes a generally cylindrical portion with first and second open ends, a first cap at least proximate to the first end and having a first aperture, and a second cap at least proximate to the second end and having a second aperture, the first membrane opening being coupled to the first aperture of the first cap, the second membrane opening being coupled to the second opening of the second endcap.

20. The apparatus of claim 15, further comprising a generally rigid liner positioned between the membrane and the vessel wall.

21. An apparatus for pressure processing a pumpable substance, comprising:

a generally rigid high-pressure vessel having a vessel wall With first and second openings;

a first valve coupled to the first opening and a second valve coupled to the second opening;

a liner adjacent to the vessel wall;

a flexible membrane disposed within the vessel and coupled to the first valve, the membrane having a first membrane opening in fluid communication with the first valve and a second membrane opening in fluid communication with the second valve, at least a portion of the membrane being spaced apart from the vessel wall to pressurize a portion of the pumpable substance adjacent to the membrane;

a source of pumpable substance coupled to the first valve; and a source of pressurizing fluid coupled to lie vessel to move the membrane toward and away from the vessel wall, wherein the second valve is only open when the membrane is moved relatively toward the vessel wall.

22. The apparatus of claim 21 wherein the pressurizing fluid is selected to include water.

23. The apparatus of claim 21 wherein the pressurizing fluid has a temperature controlled to be approximately 100° F.

24. The apparatus of claim 21 wherein the pressurizing fluid has a pressure of at least approximately 100,000 psi.

25. The apparatus of claim 21 wherein the pumpable substance is selected from a food or an abrasive slurry.

26. The apparatus of claim 21 wherein the vessel has a fourth aperture coupled to one of the source of pressurizing fluid and a return receptacle for the pressurizing fluid.

27. A device for pressure processing a pumpable substance in a high-pressure vessel, the high-pressure vessel having first and second openings, the device comprising a flexible membrane having a first membrane opening and a second membrane opening spaced apart from the first opening, the flexible membrane being sized to fit at least partially within the pressure vessel with the first membrane opening in fluid communication with the first opening of the high-pressure vessel and the second membrane opening in fluid communication with the second opening of the high-pressure vessel, the flexible membrane being coupled to an inlet valve positioned in the first opening of the pressure vessel, the inlet valve being in fluid communication with the first membrane opening to regulate a flow of pumpable substance from a source of pumpable substance through the first membrane opening and an outlet valve in fluid communication with the second membrane opening to regulate a flow of the pumpable substance to a collection of treated pumpable substance through the second membrane opening, wherein the outlet valve is closed to prevent flow of the pumpable substance to the collection of treated pumpable substance while the flexible membrane is subjected to a high pressure.

28. The device of claim 27 wherein the flexible membrane is selected from neoprene and rubber.

29. The device of claim 27 wherein the flexible membrane has a generally tubular shape.

30. The device of claim 27 wherein the flexible membrane has a first stiffiiess toward the first membrane opening and a second stiffness between the first and second membrane openings, the first stiffness being greater than the second stiffness.

31. The device of claim 27 wherein the flexible membrane includes a laminate of a first generally planar layer attached to a second generally planar layer.

* * * * *